(12) United States Patent
Tsukiyama et al.

(10) Patent No.: US 12,194,665 B2
(45) Date of Patent: Jan. 14, 2025

(54) RESIN MOLDING APPARATUS AND METHOD FOR PRODUCING RESIN MOLDED PRODUCT

(71) Applicant: TOWA CORPORATION, Kyoto (JP)

(72) Inventors: Makoto Tsukiyama, Kyoto (JP); Atsushi Morikami, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 0 days.

(21) Appl. No.: 18/034,268

(22) PCT Filed: Sep. 29, 2021

(86) PCT No.: PCT/JP2021/035758
§ 371 (c)(1),
(2) Date: Apr. 27, 2023

(87) PCT Pub. No.: WO2022/097392
PCT Pub. Date: May 12, 2022

(65) Prior Publication Data
US 2023/0382027 A1    Nov. 30, 2023

(30) Foreign Application Priority Data
Nov. 4, 2020    (JP) ................................ 2020-184618

(51) Int. Cl.
*B29C 45/02*    (2006.01)
*B29C 45/14*    (2006.01)
(Continued)

(52) U.S. Cl.
CPC ........ *B29C 45/02* (2013.01); *B29C 45/14639* (2013.01); *B29C 45/14655* (2013.01);
(Continued)

(58) Field of Classification Search
None
See application file for complete search history.

(56) References Cited

U.S. PATENT DOCUMENTS 6,200,121 B1 * 3/2001 Tsuruta ............... B29C 45/2708
264/272.17
6,261,501 B1 * 7/2001 Miyagawa ............ H01L 21/566
264/272.17
(Continued)

FOREIGN PATENT DOCUMENTS

CN    1873938 A    12/2006
JP    2002184797 A  *  6/2002
(Continued)

OTHER PUBLICATIONS

Machine translation of JP2002184797A, Sep. 6, 2012 (Year: 2012).*
(Continued)

*Primary Examiner* — Benjamin A Schiffman
(74) *Attorney, Agent, or Firm* — Dilworth & Barrese, LLP

(57) ABSTRACT

A resin molding apparatus includes: a mold die that is configured to hold an object to be molded, the object including a substrate and a chip on the substrate, and that has a cavity configured to receive a resin material through a gate; a mold clamp mechanism configured to clamp the mold die; and a control section configured to control how the mold die and the mold clamp mechanism are operated, the mold die including: a movable block configured to narrow at least a portion of an internal flow path of the cavity in which internal flow path the chip is not disposed; and a driving mechanism configured to drive the movable block with use of a fluid, the control section being configured to change a driving force of the driving mechanism during resin-molding of the object.

6 Claims, 7 Drawing Sheets

(51) Int. Cl.
  B29C 45/26   (2006.01)
  B29C 45/64   (2006.01)
  B29C 45/76   (2006.01)
  B29C 45/80   (2006.01)
  B29C 45/00     (2006.01)
(52) U.S. Cl.
  CPC .............. B29C 45/26 (2013.01); B29C 45/64 (2013.01); B29C 45/76 (2013.01); B29C 45/7653 (2013.01); B29C 45/80 (2013.01); B29C 2045/0094 (2013.01)

(56) References Cited

U.S. PATENT DOCUMENTS

| | | | | |
|---|---|---|---|---|
| 6,656,769 | B2 * | 12/2003 | Lee | H01L 21/565 |
| | | | | 438/126 |
| 7,927,923 | B2 * | 4/2011 | James | H01L 23/4951 |
| | | | | 257/667 |
| 9,452,568 | B2 * | 9/2016 | Corral | B29C 70/443 |
| 10,020,211 | B2 * | 7/2018 | Yu | H01L 21/561 |
| 11,938,660 | B2 * | 3/2024 | Tsukiyama | B29C 45/0046 |
| 2002/0017738 | A1 * | 2/2002 | Miyajima | B29C 45/14655 |
| | | | | 264/272.17 |
| 2017/0136669 | A1 * | 5/2017 | Choi | H01L 21/565 |
| 2020/0338796 | A1 * | 10/2020 | Weng | B29C 45/03 |
| 2022/0262650 | A1 * | 8/2022 | Nakatsukasa | B29C 45/14827 |
| 2022/0347892 | A1 | 11/2022 | Tsukiyama et al. | |

FOREIGN PATENT DOCUMENTS

| | | | | | |
|---|---|---|---|---|---|
| JP | 2006156796 | A | * | 6/2006 | |
| JP | 2006-339649 | A | | 12/2006 | |
| JP | 2012166430 | A | * | 9/2012 | |
| JP | 2012-192532 | A | | 10/2012 | |
| JP | 2014204082 | A | * | 10/2014 | ............. H01L 24/97 |
| JP | 2016-196146 | A | | 11/2016 | |
| JP | 6304517 | B1 | * | 4/2018 | ............. B29C 45/14 |
| JP | 2018-133396 | A | | 8/2018 | |
| JP | 2019-181872 | A | | 10/2019 | |
| JP | 6678973 | B1 | * | 4/2020 | ....... B29C 45/14647 |
| JP | 2020-90010 | A | | 6/2020 | |
| JP | 2020-121463 | A | | 8/2020 | |
| JP | 2020-174089 | A | | 10/2020 | |
| JP | 2021-45890 | A | | 3/2021 | |
| JP | 2021030515 | A | * | 3/2021 | ......... B29C 45/0046 |
| TW | 2018-32299 | A | | 9/2018 | |
| TW | 2020-21771 | A | | 6/2020 | |
| TW | 2020-38349 | A | | 10/2020 | |
| TW | 2020-40703 | A | | 11/2020 | |
| WO | 2015/159743 | A1 | | 10/2015 | |

OTHER PUBLICATIONS

Machine translation of JP2020174089A, Oct. 22, 2020 (Year: 2020).*

English translation of Office Action issued Jun. 27, 2023 in JP2020-184618.

First Office Action issued May 10, 2011 in Taiwan appln. No. 110140118.

Second Office Action issued Sep. 11, 2011 in Taiwan appln. No. 110140118.

* cited by examiner

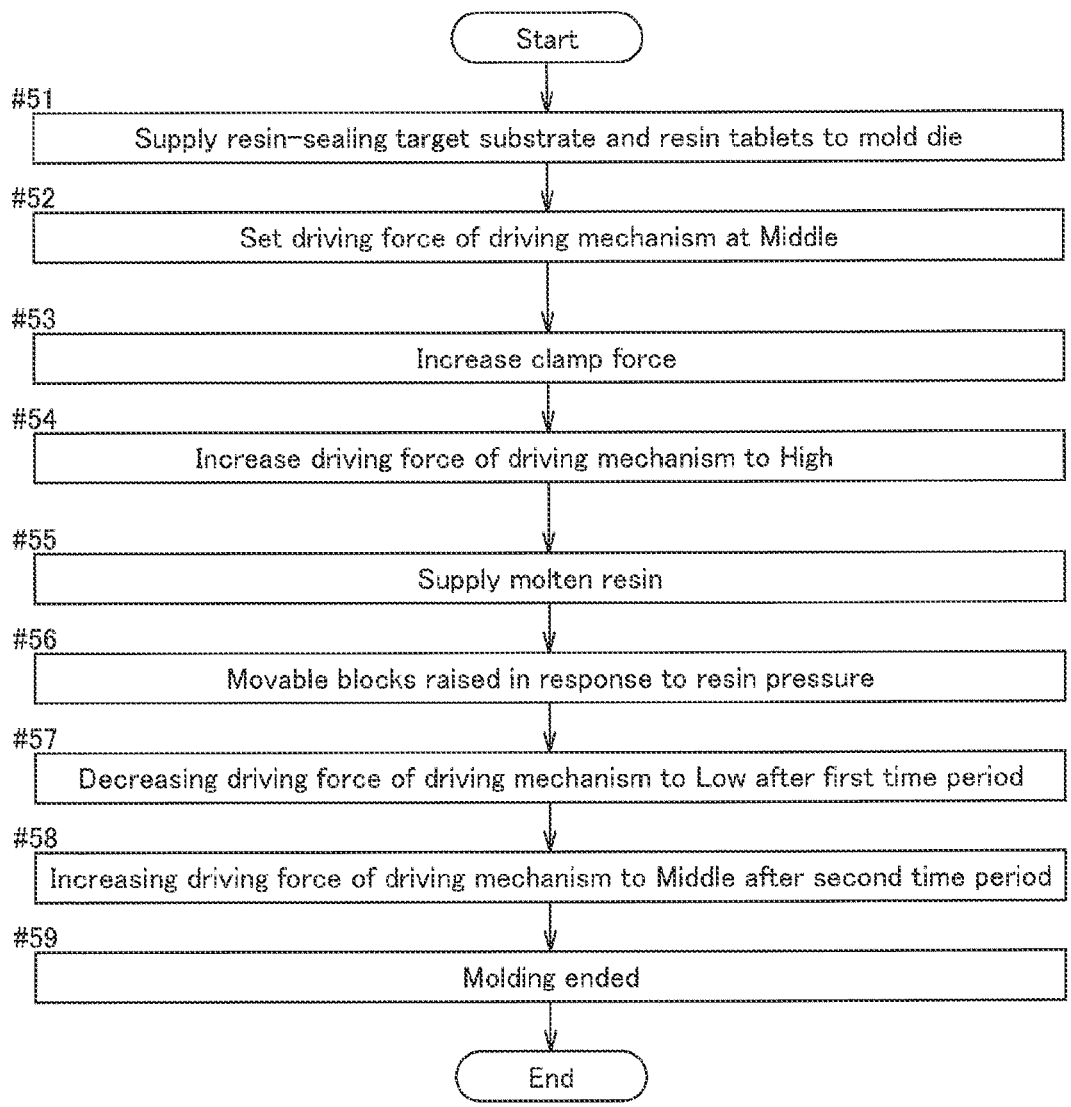

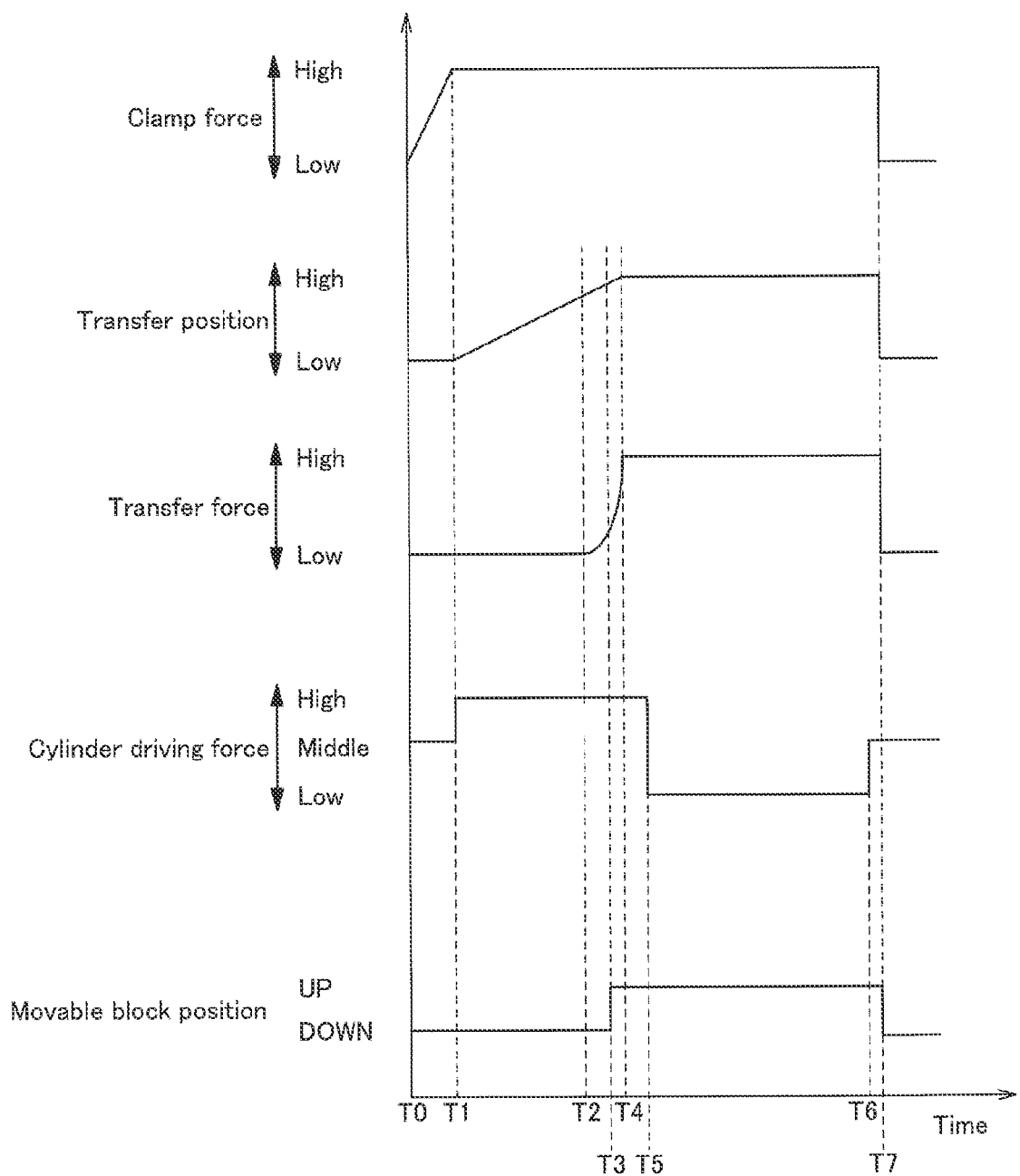

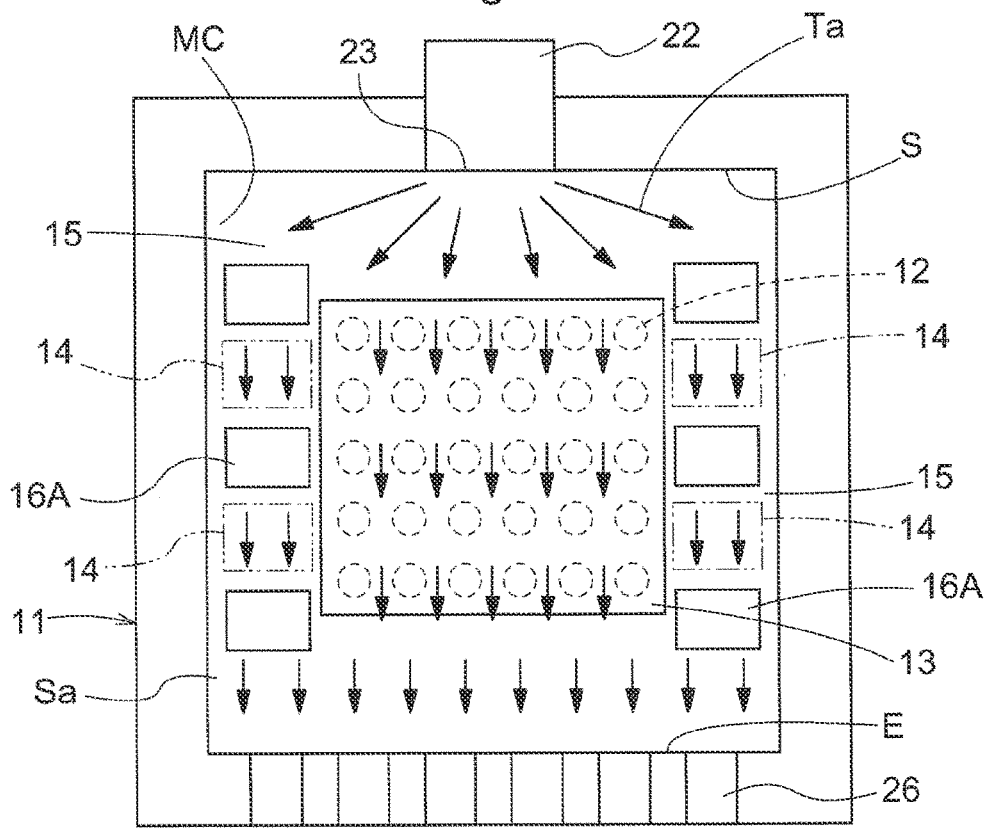
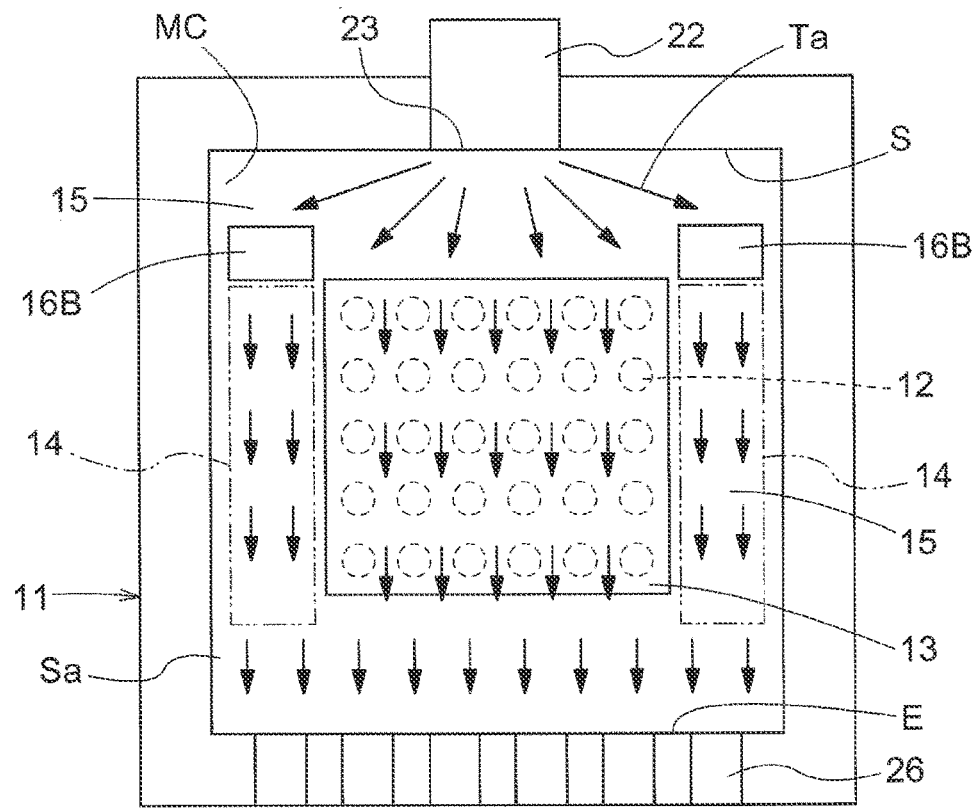

RESIN MOLDING APPARATUS AND METHOD FOR PRODUCING RESIN MOLDED PRODUCT

BACKGROUND OF THE INVENTION

Field of the Invention

This disclosure relates to a resin molding apparatus and a method for producing a resin molded product.

Background Description of Related Art

Substrates with chips mounted thereon, for example, are typically sealed up in resin for use as electronic parts. A known resin molding apparatus for sealing up, for example, substrates in resin is for transfer mold for sealing up substrates such as BGA (ball grid array) substrates in resin to produce semiconductor packages (see, for example, Patent Literature 1).

Patent Literature 1 discloses a resin molding apparatus including an upper die cavity piece disposed in the substantially entire area of an internal flow path of a cavity in which internal flow path a substrate is not disposed. The resin molding apparatus is for use in a method for producing a resin molded product which method includes: moving the upper die cavity piece by means of the urging force of compression springs such that the upper die cavity piece has an end surface flush with a surface of the substrate which surface is connected with a chip; and supplying molten resin into the cavity. The upper die cavity piece is raised gradually in response to the force by which the compression springs urge the upper die cavity piece being exceeded by the force that the molten resin applies to the end surface of the upper die cavity piece. The method includes subsequently raising the lower die while keeping the upper die cavity piece at a fixed position to reduce the cavity capacity and complete filling the cavity with molten resin.

CITATION LIST

Patent Literature

Patent Literature 1
    JP 2019-181872A

BRIEF SUMMARY OF THE INVENTION

Technical Problem

The resin molding apparatus disclosed in Patent Literature 1 is configured to move the upper die cavity piece to a predetermined position with use of compression springs each having a predetermined urging force. This means that the resin molding apparatus may inefficiently require preparing coil springs with different urging forces, depending on the desired resin molded product. Further, compression springs with a large urging force may impose a heavy load on the molding resin when the mold die is opened and thereby damage the resin molded product.

The above circumstances have led to a demand for a resin molding apparatus and a method for producing a resin molded product each of which has an improved accuracy in molding with use of a simple configuration.

Solution to Problem

A resin molding apparatus according to this disclosure characteristically includes: a mold die that is configured to hold an object to be molded, the object including a substrate and a chip on the substrate, and that has a cavity configured to receive a resin material through a gate; a mold clamp mechanism configured to clamp the mold die; and a control section configured to control how the mold die and the mold clamp mechanism are operated, the mold die including: a movable block configured to narrow at least a portion of an internal flow path of the cavity in which internal flow path the chip is not disposed; and a driving mechanism configured to drive the movable block with use of a fluid, the control section being configured to change a driving force of the driving mechanism during resin-molding of the object.

A method according to this disclosure for producing a resin-molded product characteristically includes: filling a cavity with a resin material supplied through a gate and resin-molding an object to be molded, the object including a substrate and a chip on the substrate, wherein the step involves resin-molding the object while (i) causing a driving mechanism to move a movable block, the driving mechanism being configured to drive the movable block by means of a fluid, to narrow at least a portion of an internal flow path of the cavity in which internal flow path the chip is not disposed and (ii) changing a driving force of the driving mechanism.

Advantageous Effects

This disclosure provides a resin molding apparatus and a method for producing a resin molded product each of which has an improved accuracy in molding with use of a simple configuration.

BRIEF DESCRIPTION OF DRAWINGS

FIG. 5 is a flowchart of control for a resin molding operation.

FIG. 6 is a diagram illustrating how movable blocks are operated during a resin molding operation.

FIG. 7 is a diagram schematically illustrating a mold die for Alternative Embodiment 1 as viewed from above.

FIG. 8 is a diagram schematically illustrating a mold die for Alternative Embodiment 2 as viewed from above.

DETAILED DESCRIPTION OF THE INVENTION

Figure 1:
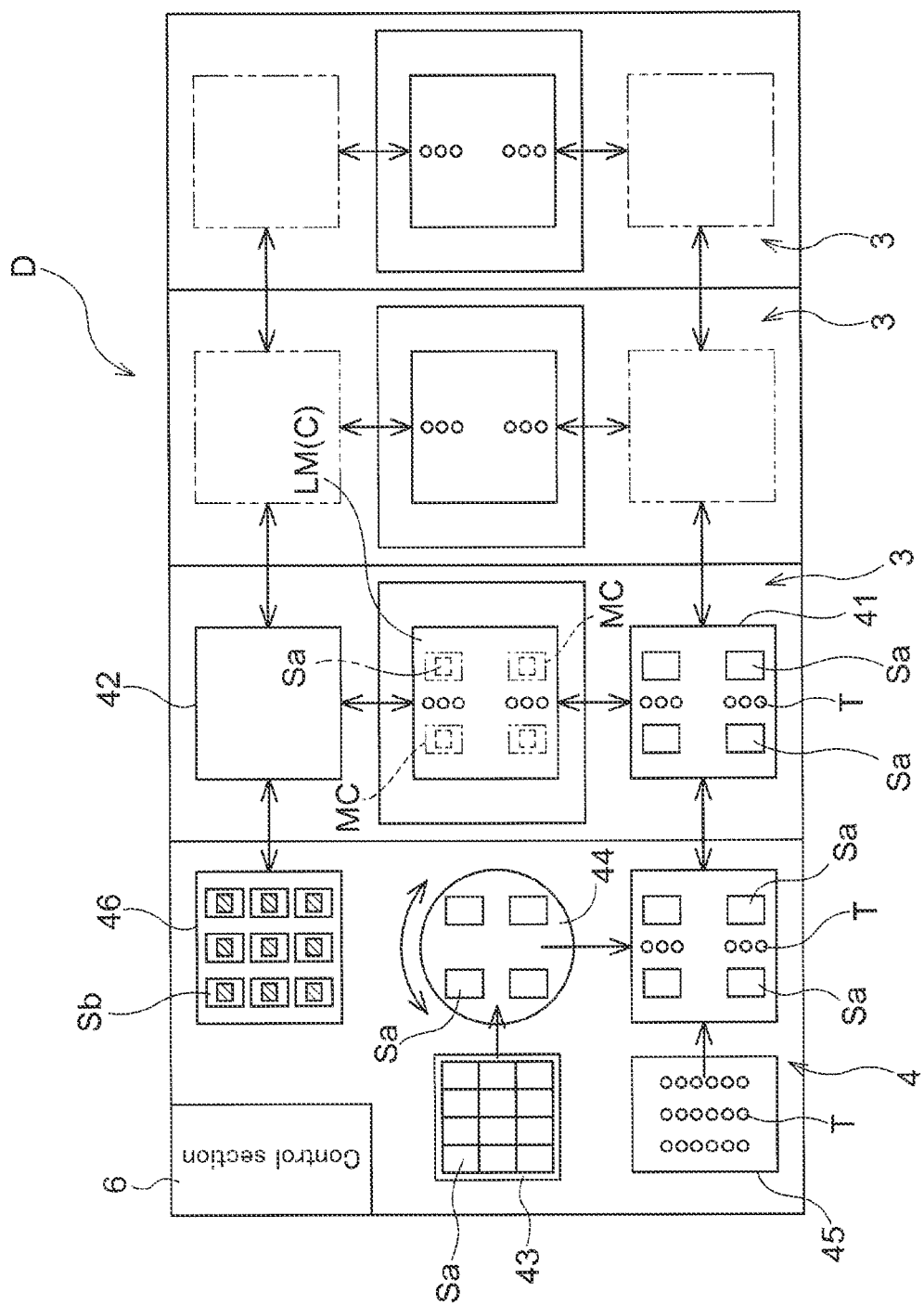
FIG. 1 is a diagram schematically illustrating a resin molding apparatus.

The description below deals with a resin molding apparatus and a method for producing a resin molded product as embodiments of this disclosure with reference to drawings. This disclosure is, however, not limited to the embodiments below, and may be altered variously as long as such alteration falls within the scope of this disclosure.

Apparatus Configuration

Objects to be molded such as substrates with semiconductor chips (hereinafter also referred to simply as "chips") mounted thereon are sealed up in resin for use as electronic parts. Such electronic parts are used as, for example, high-frequency module substrates for portable communication terminals, module substrates for electric power control, and substrates for device control. Objects to be molded can be sealed up in resin by a transfer method, that is, a technique of sealing up, for example, BGA (ball grid array) substrates in resin to produce semiconductor packages. The transfer method includes placing, for example, substrates with chips in respective cavities of a mold die, supplying resin tablets prepared by compressing powder resin into a pot in the mold die, heating the resin tablets to melt the resin tablets into molten resin, clamping the mold die, causing the molten resin to flow into the cavities, curing the resin, and opening the mold die to produce a resin molded product.

The transfer method has required designing a mold die with air vents such that the air vents and other elements are positioned appropriately in accordance with, for example, the respective shapes of substrates and chips in order to prevent voids in a resin molded product because such voids lead to defective molding. Even with appropriate air vents, molten resin flows faster in an area of the substrate in which components such as chips, resistors, and capacitors are not disposed than in an area in which such components are disposed. This speed difference lets the molten resin in lateral areas go around into the chip area to contain air (including gas generated by the molten resin), likely causing voids. In particular, in the case of a mold underfill process for a flip-chip substrate which is a substrate having a chip via protruding electrodes on the substrate, molten resin flows slowly in a narrow space between the substrate and the chip. This lets the molten resin in areas in which the chip is not disposed go around into the narrow space, likely causing voids. This has resulted in a resin molded product suffering from defective molding.

In view of the above, the present embodiments are a resin molding apparatus D and a method for producing a resin molded product each of which has an improved accuracy in molding with use of a simple configuration. The description below deals with, as an example object to be molded, a flip-chip substrate that is rectangular in a plan view. Further, the gravitational direction may be regarded as corresponding to the downward direction, whereas the direction opposite to the gravitational direction may be regarded as corresponding to the upward direction.

FIG. 1 is a diagram schematically illustrating the resin molding apparatus D. The resin molding apparatus D as the present embodiment includes molding modules 3, a supply module 4, a control section 6, and a conveying mechanism. The molding modules 3 each include a mold die C configured to seal up an object to be molded in powder resin or liquid resin. The control section 6 includes programs as software for controlling how the resin molding apparatus D is operated. The programs are stored on hardware such as a hard disc drive (HDD) or a memory, and are executed by a processor including an application-specific integrated circuit (ASIC), a field-programmable gate array (FPGA), a central processing unit (CPU), or other hardware for a computer. Specifically, the control section 6 includes a processor configured to execute, for example, the above programs as shown in the flowchart of FIG. 5.

The powder resin may be not only resin in powder form, but also resin tablets made of solid resin prepared by compressing resin powder. Heating either form of resin results in liquid, molten resin. The powder resin may be a thermoplastic resin or a thermosetting resin. A thermosetting resin has a viscosity that decreases when heated. Continuing to heat a thermosetting resin polymerizes and cures the thermosetting resin into a cured resin. The powder resin for the present embodiment is preferably in the form of resin tablets made of solid resin in view of handleability, and is also preferably a highly flowable thermosetting resin including a particulate filler to ensure that molten resin fills the space between a chip and a substrate.

The molding modules 3 are each configured to seal up resin-sealing target substrates Sa (which is an example of the "object to be molded") in resin to produce resin-sealed substrates Sb (which is an example of the "resin molded product"). The resin molding apparatus D includes a plurality of (three for the present embodiment) molding modules 3 that are independently attachable and detachable. The molding modules 3 will be detailed later.

The supply module 4 includes a substrate supply mechanism 43, a substrate alignment mechanism 44, a resin supply mechanism 45, and a substrate container section 46. The supply module 4 also provides standby positions for a loader 41 and an unloader 42 both included in the conveying mechanism. The substrate supply mechanism 43 supplies resin-sealing target substrates Sa that it stores to the substrate alignment mechanism 44. Each resin-sealing target substrate Sa is provided with a single semiconductor chip or two or more semiconductor chips aligned lengthwise and/or widthwise. The substrate alignment mechanism 44 aligns the resin-sealing target substrates Sa, which it has received from the substrate supply mechanism 43, in a manner suitable for conveyance. The resin supply mechanism 45 stores resin tablets T in a pattern suitable for conveyance.

The conveying mechanism includes a loader 41 and an unloader 42. The loader 41 conveys, for example, resin-sealing target substrates Sa, that is, substrates that are provided with semiconductor chips mounted thereon and that have not been sealed up in resin, and resin tablets T. The unloader 42 conveys resin-sealed substrates Sb, that is, substrates that have been sealed up in resin. The loader 41 is capable of receiving a plurality of (four for the present embodiment) resin-sealing target substrates Sa from the substrate alignment mechanism 44, receiving a plurality of (six for the present embodiment) resin tablets T from the resin supply mechanism 45, moving on a rail from the supply module 4 to any of the molding modules 3, and supplying the resin-sealing target substrates Sa and the resin tablets T to the molding module 3. The unloader 42 is capable of taking resin-sealed substrates Sb from any of the molding modules 3, moving on a rail from the molding module 3 to the substrate container section 46, and storing the resin-sealed substrates Sb onto the substrate container section 46. Each resin-sealed substrate Sb is provided with a semiconductor chip(s) sealed up in cured resin resulting from hardening of molten resin.

The description below deals with the molding modules 3 in detail.

Figure 2:
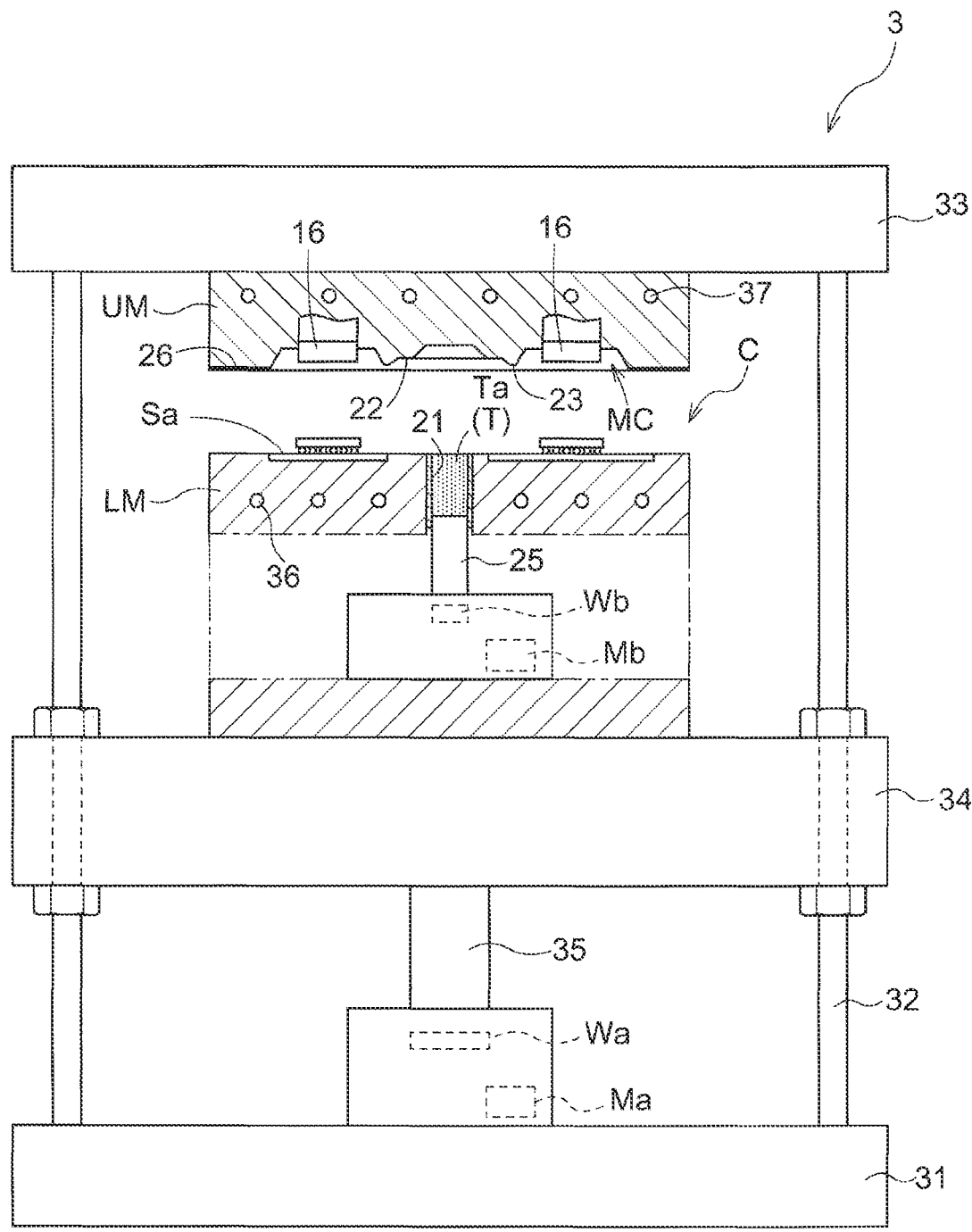
FIG. 2 is a diagram schematically illustrating a molding module.

As illustrated in FIG. 2, each molding module 3 includes a lower fixed plate 31 that is rectangular in a plan view, four tie bars 32 standing at the respective corners of the lower fixed plate 31, and an upper fixed plate 33 that is rectangular in a plan view and that is near the respective upper ends of the tie bars 32. The molding module 3 also includes, between the lower fixed plate 31 and the upper fixed plate 33, a movable platen 34 that is rectangular in a plan view. The movable platen 34 has four holes at the respective corners thereof through which the tie bars 32 extend, and is movable in the up-down direction along the tie bars 32. The molding module 3 includes, over the lower fixed plate 31, a mold clamp mechanism 35 configured to move the movable platen 34 upward and downward. The mold clamp mechanism 35 includes an electric motor Ma such as a servomotor as a driving source and a load sensor Wa such as a strain gage or load cell configured to measure the mold clamping force (hereinafter referred to as "clamp force") of the mold die C. The mold clamp mechanism 35 is capable of moving the movable platen 34 upward to clamp the mold die C and downward to open the mold die C.

The mold die C includes a lower die LM and an upper die UM that are made of, for example, metal and that face each other.

The lower die LM includes substrate placement sections each shaped to receive a resin-sealing target substrate Sa with a face upward on which components such as a semiconductor chip(s) are mounted. The lower die LM contains a lower heater 36 configured to heat resin-sealing target substrates Sa and resin tablets T. The lower die LM is provided with a cylindrical pot 21 shrink-fitted or otherwise fixed thereto that is configured to receive resin tablets T (that is, resin to be heated to melt). The lower die LM is also provided with a plunger 25 at a lower portion of the cylindrical internal space of the pot 21. The plunger 25 is drivable by an electric motor Mb such as a servomotor, and is movable upward and downward. The lower die LM is also provided with a load sensor Wb such as a strain gage or load cell configured to measure the force (hereinafter referred to as "transfer force") by which the plunger 25 pushes out molten resin Ta (which is an example of the "resin material").

The upper die UM has cavities MC each of which is rectangular in a plan view and configured to receive molten resin Ta. The upper die UM contains an upper heater 37 configured to heat the cavities MC. The upper die UM includes a cavity block having the cavities MC and a cull block having a runner 22 that allows molten resin Ta to flow from the pot 21 to the cavities MC. The cavity block has air vents 26 configured to discharge air from the cavities MC. The cavity block and the cull block are separate, fixed members of the upper die UM. The cull block has gates 23 each serving as the entrance of a cavity MC through which molten resin Ta flows from the runner 22 into the cavity MC. The cavity block and the cull block may alternatively be integral with each other. Further, the upper die UM may alternatively include an air vent block having the air vents 26 as a block separate from the cavity block.

Figure 3:
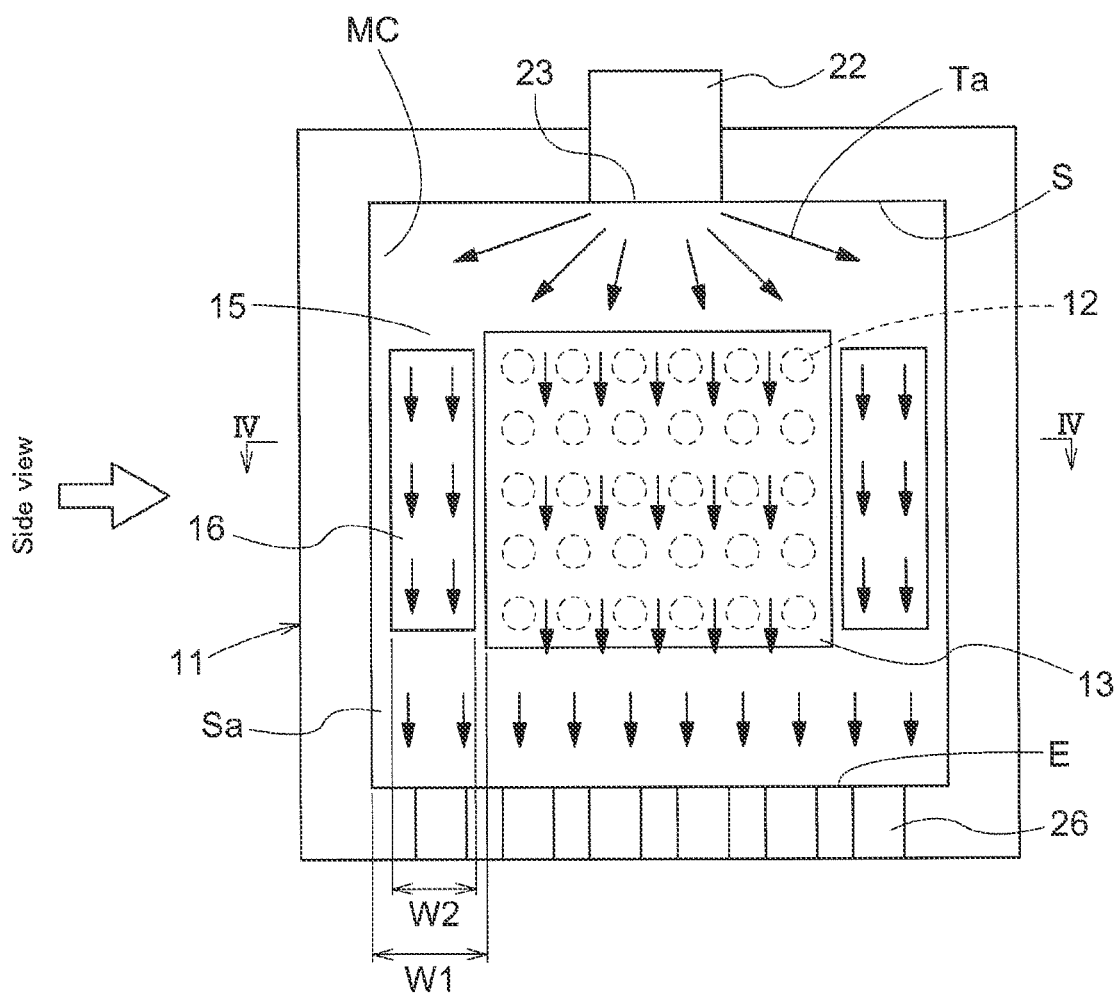
FIG. 3 is a diagram schematically illustrating a mold die as viewed from above.
Figure 4:
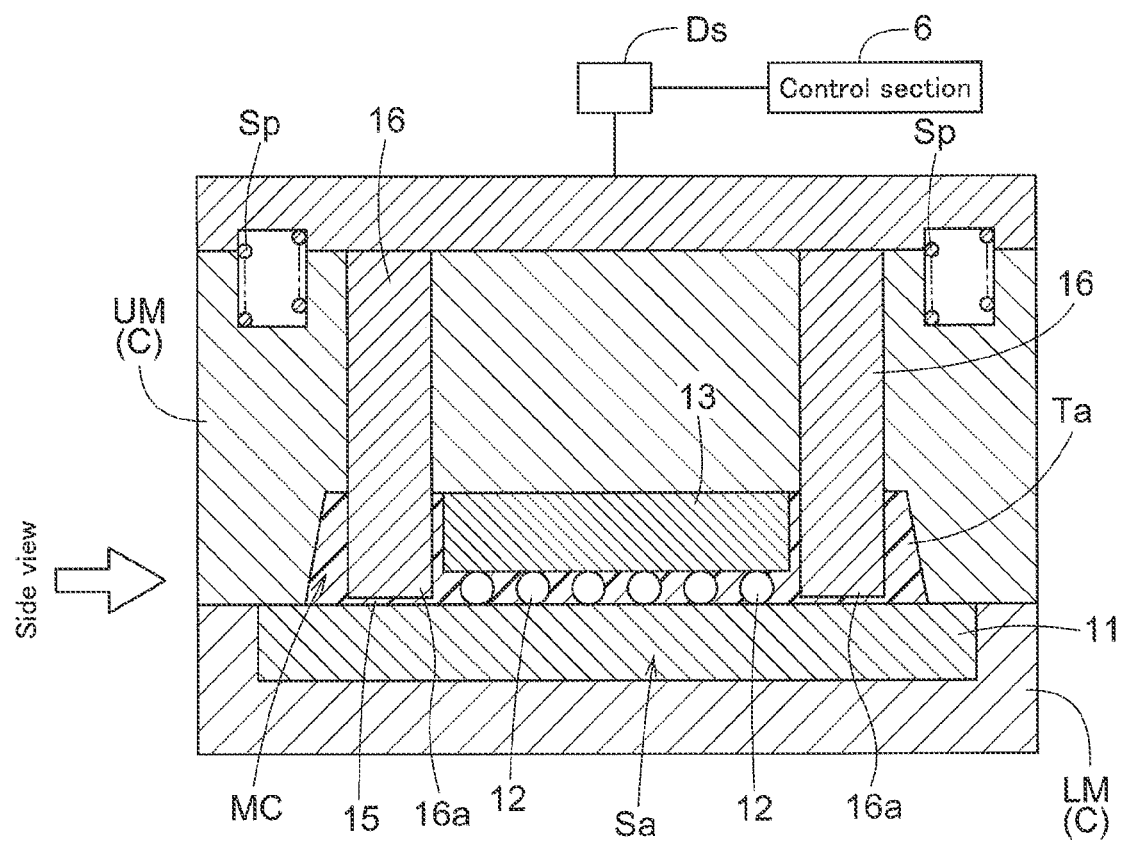
FIG. 4 is a diagram schematically illustrating a cross section of the mold die taken along line IV-IV in FIG. 3.

The description below deals with the mold die C with reference to FIGS. 3 and 4. FIG. 3 is a diagram schematically illustrating a cavity MC in a plan view. FIG. 4 is a diagram schematically illustrating a cross section of the cavity MC taken along line IV-IV in FIG. 3 in the direction perpendicular to FIG. 3 (that is, in the up-down direction). The present embodiment described here is arranged to expose a face of a chip 13 (see FIG. 4), but may alternatively be arranged to cover that face with resin.

As illustrated in FIG. 3, each cavity MC has, at a central portion of one side S thereof, a gate 23 through which the cavity MC receives molten resin Ta that has flown from the above-described pot 21 into the runner 22. The cavity MC has, at another side E thereof opposite to the one side S, air vents 26 through which air may be discharged from the cavity MC. As illustrated in FIGS. 3 and 4, each resin-sealing target substrate Sa for the present embodiment is a flip-chip substrate, which includes a substrate 11, a plurality of protruding electrodes 12 arranged on the substrate 11 in a two-dimensional array, and a chip 13 electrically connected to the protruding electrodes 12. The protruding electrodes 12 and the chip 13 are in a central area of the substrate 11 in a plan view. The central area is a chip area, whereas the area of the substrate 11 surrounding the central area is a non-chip area. The chip 13 is, for example, an IC chip, which includes a semiconductor chip and a large number of electronic elements and lines on the semiconductor chip.

On such a flip-chip substrate, molten resin Ta supplied through the gate 23 flows from the one side S of the cavity MC (that is, the starting end of the flow) to the other side E thereof (that is, the terminal end of the flow). The molten resin Ta would flow faster in (i) lateral areas of the substrate 11 in each of which the chip 13 is not disposed (that is, the areas extending along both lateral sides of the substrate 11 from the one side S of the cavity MC to the other side E thereof) than in (ii) the chip area, in which the chip 13 is disposed (that is, the central area of the substrate 11). This speed difference would let the molten resin Ta in the lateral areas go around into the chip area to contain air (including gas generated by the molten resin Ta), likely causing voids. For a flip-chip substrate which is a substrate 11 having a chip 13 via protruding electrodes 12 on the substrate 11, in particular, molten resin Ta would flow even more slowly in the narrow space between the substrate 11 and the chip 13 (that is, the area in which the protruding electrodes 12 are disposed) than in the lateral areas in which the chip 13 is not disposed. This would let the molten resin Ta in the lateral areas go around into the narrow space, likely causing voids.

In view of the above, the mold die C (specifically, the upper die UM) for the present embodiment includes movable blocks 16 and compression springs Sp. The movable blocks 16 are on both lateral sides of the cavity MC that are perpendicular to the one side S and the other side E of the cavity MC, and are configured to narrow lateral flow paths 15 (which is an example of the "at least a portion of an internal flow path of the cavity") for molten resin Ta flowing through the cavity MC. The compression springs Sp are configured to urge the movable blocks 16 upward. The corresponding molding module 3 includes a driving mechanism Ds in the form of, for example, an air cylinder configured to drive the movable blocks 16 with use of air (which is an example of the "fluid"). The movable blocks 16 for the present embodiment are provided for the upper die UM in such a manner as to be movable upward and downward, and cover those areas of the pair of lateral flow paths 15 of the cavity MC which are laterally adjacent to the chip 13. Specifically, the movable blocks 16 are configured to narrow the lateral flow paths 15 (that is, reduce the cross-sectional area of each lateral flow path 15) for a predetermined time period from the start of supply of molten resin Ta to reduce the amount of molten resin Ta flowing through the lateral flow paths 15. The movable blocks 16 for the present embodiment are each a rectangular parallelepiped. The movable blocks 16 each have a width W2 that is approximately 90% of the width W1 of the corresponding lateral flow path 15 (that is, approximately 90% of the minimum width between the corresponding lateral side of the chip 13 and the corresponding wall face of the cavity MC). The width W2 of each movable block 16 has a proportion to the width W1 of the corresponding lateral flow path 15 which proportion is selected as appropriate in view of such matters as the viscosity of the molten resin Ta, the size of the gap between the chip 13 and the substrate 11, and the size and number of the protruding electrodes 12. The proportion is, however, preferably approximately 50% or higher. Each movable block 16 is moved to have a leading end 16a (that is, the lower end face) at such a height that in a side view, the leading end 16a is in the narrow space between the substrate 11 and the chip 13 (that is, the gap area between the substrate 11 and the chip 13). This narrows the lateral flow paths 15. Each movable block 16 is, in other words, arranged such that while it has narrowed the corresponding lateral flow path 15, the leading end 16a coincides in a side view with the narrow space between the substrate 11 and the chip 13.

The movable blocks 16 are configured to be (i) inserted into the cavity MC by means of the driving force of the driving mechanism Ds (hereinafter referred to as "cylinder driving force") and (ii) pulled out of the cavity MC by means of the urging force of the compression springs Sp in response to deactivation of the driving mechanism Ds such that each movable block 16 has a leading end 16a (that is, a lower end surface) flush with an lower surface of the upper die UM which inner surface is adjacent to the cavity MC. The movable blocks 16 are also movable in response to the driving force of the driving mechanism Ds being exceeded by the total of the respective urging forces of the compression springs Sp and the force that the molten resin Ta flowing through the cavity MC applies to the movable blocks 16 such that each movable block 16 has a leading end 16a flush with an inner surface of the upper die UM which inner surface is adjacent to the cavity MC. The movable blocks 16 are, in other words, switchable between narrowing the lateral flow paths 15 of the cavity MC and fully opening the lateral flow paths 15.

As described above, the movable blocks 16 are on both lateral sides of the cavity MC that are perpendicular to the one side S and the other side E of the cavity MC, and are configured to narrow lateral flow paths 15 for molten resin Ta flowing through the cavity MC. The movable blocks 16 reduce the amount of molten resin Ta flowing through the lateral flow paths 15. For a resin-sealing target substrate Sa provided with, for example, a chip 13 and protruding electrodes 12, which are flow resistances for molten resin Ta, the above configuration allows molten resin Ta to flow in the outer area of the cavity MC, in which the chip 13 is not disposed, at a speed nearly equal to the speed at which molten resin Ta flows in the inner area of the cavity MC, in which the chip 13 is disposed. This allows the leading portions of molten resin Ta in the outer area of the cavity MC to be aligned horizontally with the leading portion of molten resin Ta in the inner area of the cavity MC, and thereby prevents the molten resin Ta in the outer area from going around into the inner area to contain air at the terminal end of the flow (the other side E) of molten resin Ta through the cavity MC. This in turn likely prevents voids in resin-sealed substrates Sb (resin molded product), improving the accuracy in molding.

Method for Producing Resin Molded Product and Mode of Controlling Resin Molding

The description below deals with a method for producing a resin molded product with reference to FIGS. 1 to 6. The method for producing a resin molded product (resin-sealed substrates Sb) includes: supplying the mold die C with resin-sealing target substrates Sa and resin tablets T; and causing molten resin Ta to enter each cavity MC through the corresponding gate 23 and fill the cavity MC for resin molding of the resin-sealing target substrate Sa. The second step (molding step) is a step of a molding module 3 resin-molding a resin-sealing target substrate Sa after the resin-sealing target substrate Sa enters the molding module 3 and before the resulting resin-sealed substrate Sb leaves the molding module 3. The molding step includes clamping the mold die C. During the molding step, the control section 6 controls how the mold die C and the mold clamp mechanism 35 are operated, as described below mainly with reference to FIGS. 5 and 6.

As illustrated in FIG. 1, the resin molding apparatus D preheats the loader 41 while thermally insulating the space for containing resin tablets T, and also supplies electric power to the heaters 36 and 37 in advance to heat the mold die C (see FIG. 2 as well). The loader 41 then receives a plurality of resin-sealing target substrates Sa having been taken out from the substrate supply mechanism 43. The loader 41 also receives resin tablets T as aligned by the resin supply mechanism 45 into the space for containing resin tablets T. The loader 41 conveys the resin-sealing target substrates Sa to a molding module 3. The loader 41 then places the resin-sealing target substrates Sa onto substrate placement sections of the lower die LM with each resin-sealing target substrate Sa having a face facing upward on which a semiconductor chip is mounted, and supplies the resin tablets T into the pot 21 (see FIG. 2; and #51 in FIG. 5). This allows the lower heater 36 in the lower die LM to heat the resin tablets T into molten resin Ta. The upper die UM is provided with a release film (not illustrated in the drawings) adsorbed to its lower molding surface before the mold clamp mechanism 35 raises the movable platen 34 as described below.

Then, as illustrated in FIG. 2, the mold clamp mechanism 35 raises the movable platen 34 to move the lower die LM relatively toward the upper die UM and thereby bring the lower die LM into close contact with the upper die UM. Then, the control section 6 sets the driving force of the driving mechanism Ds to "Middle" (for example, 1 t) and lowers the movable blocks 16 to narrow the lateral flow paths 15 (that is, to almost come into contact with the lower die LM), and also causes air to be discharged from the cavities MC through the air vents 26 (see FIGS. 3 and 4; #52 in FIG. 5; and the cylinder driving force at time point T0 in FIG. 6). The control section 6 then activates the mold clamp mechanism 35 so that the mold clamp mechanism 35 increases its clamp force to a predetermined value (see #53 in FIG. 5; and the clamp force from time point T0 to time point T1 in FIG. 6). The present embodiment is configured such that the driving mechanism Ds is set to have a relatively small driving force before the mold clamp mechanism 35 starts to clamp the mold die C (see FIG. 6, from time point T0 to time point T1). This prevents the mold die C from being deformed by the movable blocks 16. The predetermined value of the clamp force may be preset as a mold clamp force. The clamp force may be measured with use of the load sensor Wa. The mold clamp mechanism for the present embodiment keeps its clamp force at the predetermined value until T7 in FIG. 6 mentioned later. The mold clamp mechanism 35 may alternatively increase its clamp force to a value smaller than the predetermined value at time point T1 in FIG. 6 and then gradually increases it to the predetermined value through the period from T1 to T5 in FIG. 6.

Then, the control section 6 increases the driving force of the driving mechanism Ds from "Middle" to "High" (for example, 1.5 t) and keeps the driving force at "High" (see #54 in FIG. 5; and the cylinder driving force at time point T1 in FIG. 6). The control section 6 also causes the electric motor Mb to raise the plunger 25 to cause the molten resin Ta to flow from the pot 21 through each runner 22 toward the corresponding gate 23 (see FIG. 2; #55 in FIG. 5; and the transfer position from time point T1 to time point T2 in FIG. 6). The molten resin Ta then enters the cavity MC.

The molten resin Ta having entered each cavity MC through the corresponding gate 23 flows from one side S of the cavity MC to another side E thereof, as illustrated in FIG. 3. Molten resin Ta having reached the chip area enters the narrow space between the substrate 11 and the chip 13 in a central area of the substrate 11, and starts to flow in a reduced amount. The protruding electrodes 12 between the chip 13 and the substrate 11 also hinder the flow of the molten resin Ta and thereby reduce the amount of the flow. Meanwhile, the movable blocks 16 narrow the lateral flow paths 15 in the respective lateral areas of the substrate 11 for a predetermined time period to reduce the amount of molten resin Ta flowing through the lateral flow paths 15. This allows molten resin Ta to flow through the lateral flow paths 15 at a speed nearly equal to the speed at which molten resin Ta flows in the narrow space between the substrate 11 and the chip 13. This in turn allows the leading portion of molten resin Ta through the lateral flow paths 15 to be substantially aligned horizontally with the respective leading portions of molten resin Ta in the narrow space in a direction parallel to the other side E of the cavity MC at the terminal end of the flow of molten resin Ta through the cavity MC. This prevents the molten resin Ta in the outer area from laterally entering the inner area to contain air at the terminal end of the flow (the other side E).

After the molten resin Ta has filled the cavity MC, the rise of the plunger 25 increases the force by which the plunger 25 pushes out the molten resin Ta (see the transfer force from time point T2 to time point T4 in FIG. 6). Then, in response to the driving force of the driving mechanism Ds being exceeded by the total of the respective urging forces of the compression springs Sp and the force that the molten resin Ta flowing through the cavity MC applies to the movable blocks 16, the movable blocks 16 rise spontaneously until their respective leading ends 16a become flush with those lower surfaces of the upper die UM which are adjacent to the cavity MC (see #56 in FIG. 5; and the movable block position at time point T3 in FIG. 6). The present embodiment keeps the driving force of the driving mechanism Ds at a constant value and allows the molten resin Ta flowing through the cavity MC to apply force to and raise the movable blocks 16. This causes air to flow out of the narrow space between the substrate 11 and the chip 13 toward the lateral flow paths 15. Removing air from between the substrate 11 and the chip 13 as such likely prevents voids in resin-sealed substrates Sb, improving the accuracy in molding.

In response to the transfer force reaching a predetermined value, the control section 6 keeps the transfer force at the predetermined value and causes the mold die C to cure the molten resin Ta for a predetermined time period (see the transfer force from time point T4 to time point T7 in FIG. 6). The predetermined value may be preset as a transfer force for starting the curing operation. The transfer force may be measured with use of the load sensor Wb. A first time period after the start of the curing operation, the control section 6 decreases the driving force of the driving mechanism Ds from "High" to "Low" (for example, 0 t) (see #57 in FIG. 5; and the cylinder driving force at time point T5 in FIG. 6). The first time period may be preset as a time period immediately after the transfer force reaches its predetermined value (for example, several seconds after the start of the curing operation). Decreasing the driving force of the driving mechanism Ds to "Low" reliably allows the compression springs Sp to raise the movable blocks 16 even if the molten resin Ta flowing through the cavity MC fails to raise the movable blocks 16.

A second time period after the start of the curing operation, the control section 6 increases the driving force of the driving mechanism Ds from "Low" to "Middle" (for example, 1 t) (see #58 in FIG. 5; and the cylinder driving force at time point T6 in FIG. 6). The second time period is longer than the first time period, and is preset as a time period immediately before the end of the curing operation (for example, several seconds). The second time period results from subtracting a time period from the predetermined time period for the curing operation. The present embodiment is configured such that the driving force of the driving mechanism Ds is set at "Middle" before the end of the curing operation. The driving force before the end of the curing operation may, however, be at any level that does not damage the resin-sealed substrate Sb.

After the end of the curing operation, the control section 6 decreases the clamp force of the mold clamp mechanism 35 to lower the movable platen 34 and open the mold die C (see FIG. 2; and the clamp force at time point T7 in FIG. 6). The resin-sealed substrate Sb is then released from the cavity MC. This ends the resin molding operation (see #59 in FIG. 5). The present embodiment is configured such that the control section 6 increases the driving force of the driving mechanism Ds to "Middle" before the end of the curing operation. This lowers the movable blocks 16 and thereby assists the release of the resin-sealed substrate Sb (see the movable block position at T7 and later in FIG. 6). The resin-sealed substrate Sb is stored on the substrate container section 46 with use of the unloader 42 (see FIG. 1 as well).

Alternative Embodiments

For ease of understanding, the description below uses the same terms and reference signs as in the description of the above embodiment for similar elements.

1. As illustrated in FIG. 7, the present embodiment involves, an object to be molded, a substrate 11 provided with a chip 13 in the central area and a plurality of individual passive components 14 such as capacitors, coils, and resistors in the lateral areas. The movable blocks 16A for the present embodiment are configured to narrow the lateral flow paths 15 and each positioned not to come into contact with the individual passive components 14. The movable blocks 16A are sized and positioned in view of the speed of the flow of molten resin Ta through the narrow space between the substrate 11 and the chip 13 as well as, for example, the respective flow resistances and footprints of the individual passive components 14. Specifically, the movable blocks 16A are sized and positioned through a simulation of the flow of molten resin Ta for adjustment such that molten resin Ta flows through the lateral flow paths 15 at a speed nearly equal to the speed at which molten resin Ta flows in the narrow space between the substrate 11 and the chip 13.

2. As illustrated in FIG. 8, the present embodiment involves, an object to be molded, a substrate 11 provided with a chip 13 in the central area and a plurality of individual passive components 14 such as capacitors, coils, and resistors in the entire areas laterally opposite to each other across the chip 13. The movable blocks 16B, in this case, cannot be disposed in the areas lateral to the chip 13, and are thus in the form of a pair of movable blocks 16B configured to narrow the lateral flow paths 15 and each positioned in a portion of the corresponding lateral area of the substrate 11 which portion is apart from the chip 13 toward the gate 23. This allows the movable blocks 16B to narrow the flow path for molten resin Ta in the lateral areas of the substrate 11 between the gate 23 and the chip 13, and in turn allows molten resin Ta to flow in the outer area of the cavity MC, in which the chip 13 is not disposed, at a speed nearly equal to the speed at which molten resin Ta flows in the narrow space between the substrate 11 and the chip 13. The movable blocks 16B for the present embodiment are also sized and positioned in view of the speed of the flow of molten resin Ta through the narrow space between the substrate 11 and the chip 13 as well as, for example, the respective flow resistances and footprints of the individual passive components 14.

3. The fluid that the driving mechanism Ds uses to drive the movable blocks 16 may be a liquid. Further, the control section 6 does not necessarily switch the driving force of the driving mechanism Ds as for the embodiments described above; for instance, the control section 6 may alternatively omit decreasing the driving force of the driving mechanism Ds after the start of the curing operation and/or increasing the driving force of the driving mechanism Ds before the end of the curing operation.

4. The movable blocks 16, 16A, 16B for the embodiments described above are disposed only over the lateral flow paths 15. The movable blocks 16, 16A, 16B may alternatively be disposed over portions of the internal flow path of the cavity MC which portions are adjacent to the gate 23 or the air vents 26.

5. One or more of the molding modules 3 may each include a release film supply mechanism (not illustrated in the drawings) configured to supply a release film to the upper die UM and cause the release film to adsorb to the molding surface of the upper die UM. This facilitates releasing the resin-sealed substrate Sb and prevents molten resin Ta from flowing into gaps that allow the movable blocks 16 to move relative to the upper die UM.

6. The movable blocks 16 may each have a leading end 16a with protrusions and depressions. This allows the protrusions and depressions to narrow the lateral flow paths when the movable blocks 16 are in close contact with a substrate 11. The leading end 16a or the protrusions and depressions come into contact with a substrate 11, which eliminates the need to delicately control the movable blocks 16 to leave a gap between the movable blocks 16 and the substrate 11.

7. The embodiments described above are each an example in which the protruding electrodes 12 are arranged in a grid pattern. The protruding electrodes 12 are, however, simply arranged in a two-dimensional array, for example, in two lines.

8. The pot 21, the cavity block, and the cull block may each be included in either of the upper die UM and the lower die LM. Further, the cull block may have any number of gates 23 in any arrangement; for example, a gate 23 may extend entirely along the one side S of the corresponding cavity MC. Further, this disclosure may be configured such that objects to be molded such as resin-sealing target substrates S a are fixed to the upper die UM, while the lower die LM has cavities MC.

9. The object to be molded, that is, to be sealed up in resin, is not limited to a flip-chip substrate, and may be a substrate provided with a semiconductor chip. The resin molding apparatus D described above may each be used to entirely seal up in resin a substrate with a plurality of semiconductor chips for production of MAP (molded array packaging).

10. The embodiments described above involve exposing a face of the chip 13. This disclosure may alternatively involve covering that face of the chip 13 with resin. In this case, this disclosure may further include a movable block 16 positioned to be over a chip 13 and configured to temporarily stop molten resin Ta from flowing from the gate 23 across the upper face of the chip 13 toward the air vents 26.

Summary of Above Embodiments

The description below summarizes the resin molding apparatus D and the method for producing a resin molded product each described above as an embodiment.

The resin molding apparatus D characteristically includes: a mold die C that is configured to hold a resin-sealing target substrate Sa (object to be molded), the resin-sealing target substrate Sa including a substrate 11 and a chip 13 on the substrate 11, and that has a cavity MC configured to receive molten resin Ta (resin material) through a gate 23; a mold clamp mechanism 35 configured to clamp the mold die C; and a control section 6 configured to control how the mold die C and the mold clamp mechanism 35 are operated, the mold die C including: a movable block 16 configured to narrow at least a portion of an internal flow path (lateral flow path 15) of the cavity MC in which internal flow path the chip 13 is not disposed; and a driving mechanism Ds configured to drive the movable block 16 with use of air (fluid), the control section 6 being configured to change a driving force of the driving mechanism Ds during resin-molding of the resin-sealing target substrate Sa (object).

With the above configuration, the resin molding apparatus D includes a movable block 16 configured to narrow at least a portion of an internal flow path of the cavity MC in which internal flow path the chip 13 is not disposed. This allows molten resin Ta to flow in an area of the cavity MC in which area the chip 13 is not disposed at a speed as close as possible to the speed at which molten resin Ta flows in an area of the cavity MC in which area the chip 13 is disposed. This in turn prevents the molten resin Ta in the area of the cavity MC in which the chip 13 is not disposed from laterally entering the area of the cavity MC in which the chip 13 is disposed earlier than the molten resin Ta in the area of the cavity MC in which the chip 13 is disposed to contain air. Further, with the above configuration, the control section 6 is configured to change the driving force of the driving mechanism Ds, which is configured to drive the movable block 16 with use of air, during resin-molding of the resin-sealing target substrate Sa (object to be molded). This allows the control section 6 to change the driving force of the driving mechanism Ds depending on the situation, thereby improving the accuracy in molding with use of a simple configuration as compared to, for example, a driving mechanism configured to urge the movable block 16 with a fixed force.

(2) The resin molding apparatus D may be configured such that the control section 6 increases the driving force of the driving mechanism Ds in response to a clamp force of the mold clamp mechanism 35 reaching a predetermined value.

With the above configuration, the control section 6 increases the driving force of the driving mechanism Ds in response to the clamp force of the mold clamp mechanism 35 reaching a predetermined value. This prevents the movable block 16 from disadvantageously coming into strong contact with the mold die C before the mold clamp mechanism 35 clamps the mold die C and deforming the mold die C.

(3) The resin molding apparatus D may be configured such that the control section 6 decreases the driving force of the driving mechanism Ds after the mold die C starts to cure the molten resin Ta (resin material).

With the above configuration, the control section 6 decreases the driving force of the driving mechanism Ds after the mold die C starts to cure the molten resin Ta. This allows the movable block 16 to be reliably moved out of the cavity MC.

(4) The resin molding apparatus D may be configured such that the control section 6 increases the driving force of the driving mechanism Ds before the mold die C ends curing the molten resin Ta (resin material).

With the above configuration, the control section 6 increases the driving force of the driving mechanism Ds before the mold die C ends curing the molten resin Ta. This allows the movable block 16 to assist the release of the resin-sealed substrate Sb.

(5) The method for producing a resin molded product characteristically includes the step of: filling a cavity MC with molten resin Ta (resin material) supplied through a gate 23 and resin-molding a resin-sealing target substrate Sa (object to be molded), the resin-sealing target substrate Sa including a substrate 11 and a chip 13 on the substrate 11, wherein the step involves resin-molding the resin-sealing target substrate Sa (object) while (i) causing a driving mechanism Ds to move a movable block 16, the driving mechanism Ds being configured to drive the movable block 16 by means of air (fluid), to narrow at least a portion of an internal flow path (lateral flow path 15) of the cavity MC in which internal flow path the chip 13 is not disposed and (ii) changing a driving force of the driving mechanism Ds.

The above method includes a step that allows molten resin Ta to flow in an area of the cavity MC in which area the chip 13 is not disposed at a speed as close as possible to the speed at which molten resin Ta flows in an area of the cavity MC in which area the chip 13 is disposed. This in turn prevents the molten resin Ta in the area of the cavity MC in which the chip 13 is not disposed from laterally entering the area of the cavity MC in which the chip 13 is disposed earlier than the molten resin Ta in the area of the cavity MC in which the chip 13 is disposed to contain air. Further, the above method changes the driving force of the driving mechanism Ds, which is configured to drive the movable block 16 with use of air, during resin-molding of the resin-sealing target substrate Sa. This makes it possible to change the driving force of the driving mechanism Ds depending on the situation, thereby improving the accuracy in molding as compared to, for example, a driving mechanism configured to urge the movable block 16 with a fixed force.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. This disclosure is not limited to those embodiments, and may be altered as appropriate, as long as such an alteration does not result in a failure to attain an object of this disclosure.

INDUSTRIAL APPLICABILITY

This disclosure is applicable to a resin molding apparatus and a method for producing a resin molded product. This disclosure is applicable particularly effectively to production of a thick package including sealing resin with a thickness of 1 mm or more or a package for use in a vehicle. This disclosure is also applicable particularly effectively to the case of a mold underfill process for a flip-chip substrate including a substrate and a chip with a gap therebetween of 100 μm or less.

REFERENCE SIGNS LIST

11 Substrate
13 Chip
15 Lateral flow path (at least a portion of an internal flow path of a cavity)
16 Movable block
23 Gate
35 Mold clamp mechanism
C Mold die
D Resin molding apparatus
MC Cavity
S a Resin-sealing target substrate (object to be molded)
Sb Resin-sealed substrate (resin molded product)
Ta Molten resin (resin material)

The invention claimed is:

1. A resin molding apparatus, comprising:
a mold die that is configured to hold an object to be molded, the object including a substrate and a chip on the substrate, and that has a cavity configured to receive a resin material through a gate;
a mold clamp mechanism configured to clamp the mold die; and
a control section configured to control how the mold die and the mold clamp mechanism are operated,
the mold die including:
a movable block configured to be inserted into the cavity and narrow at least a portion of an internal flow path of the cavity in which internal flow path the chip is not disposed; and
a driving mechanism configured to drive the movable block with use of a fluid,
the control section being configured to change a driving force of the driving mechanism during resin-molding of the object, and
the control section being configured or programmed to increase the driving force of the driving mechanism in response to a clamp force of the mold clamp mechanism reaching a predetermined value.

2. The resin molding apparatus according to claim 1, wherein
the control section is configured or programmed to decrease the driving force of the driving mechanism after the mold die starts to cure the resin material.

3. The resin molding apparatus according to claim 1, wherein
the control section is configured or programmed to increase the driving force of the driving mechanism before the mold die ends curing the resin material.

4. The resin molding apparatus according to claim 1, wherein the driving force of the driving mechanism is increased in response to a clamping force of the mold clamp mechanism reaching a predetermined value.

5. The resin molding apparatus according to claim 4, wherein
the driving mechanism is in the form of an air cylinder configured to drive the movable block with air, and
spring mechanism is arranged to bias said movable block upwardly away from the mold cavity.

6. A method for producing a resin molded product with the resin molding apparatus of claim 1, the method comprising the step of:

filling the cavity with the resin material supplied through the gate and resin-molding the object to be molded, wherein the step involves resin-molding the object while (i) causing the driving mechanism to move the movable block, to narrow at least a portion of the internal flow path of the cavity in which internal flow path the chip is not disposed and (ii) changing the driving force of the driving mechanism.

* * * * *